United States Patent
Hogg

(10) Patent No.: US 9,053,730 B1
(45) Date of Patent: Jun. 9, 2015

(54) DISK DRIVE COMPRISING EXTENDED RANGE HEAD PROXIMITY SENSOR

(71) Applicant: Western Digital Technologies, Inc., Irvine, CA (US)

(72) Inventor: Dennis W. Hogg, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/185,909

(22) Filed: Feb. 20, 2014

Related U.S. Application Data

(62) Division of application No. 13/470,190, filed on May 11, 2012, now Pat. No. 8,681,442.

(51) Int. Cl.
  G11B 21/02 (2006.01)
  G11B 5/60 (2006.01)

(52) U.S. Cl.
  CPC .................................... *G11B 5/6076* (2013.01)

(58) Field of Classification Search
  None
  See application file for complete search history.

(56) References Cited

U.S. PATENT DOCUMENTS

| | | | |
|---|---|---|---|
| 4,259,643 A | | 3/1981 | Monticelli et al. |
| 4,510,442 A | | 4/1985 | Neher |
| 4,596,148 A | | 6/1986 | Lasser et al. |
| 4,768,170 A | | 8/1988 | Hoff |
| 4,853,810 A | * | 8/1989 | Pohl et al. ........................ 360/75 |
| 5,986,839 A | | 11/1999 | Klaassen et al. |
| 5,991,113 A | * | 11/1999 | Meyer et al. .................... 360/75 |
| 6,018,789 A | | 1/2000 | Sokolov et al. |
| 6,065,095 A | | 5/2000 | Sokolov et al. |
| 6,078,452 A | | 6/2000 | Kittilson et al. |
| 6,081,447 A | | 6/2000 | Lofgren et al. |
| 6,092,149 A | | 7/2000 | Hicken et al. |
| 6,092,150 A | | 7/2000 | Sokolov et al. |
| 6,094,707 A | | 7/2000 | Sokolov et al. |
| 6,105,104 A | | 8/2000 | Guttmann et al. |
| 6,111,717 A | | 8/2000 | Cloke et al. |
| 6,145,052 A | | 11/2000 | Howe et al. |
| 6,175,893 B1 | | 1/2001 | D'Souza et al. |
| 6,178,056 B1 | | 1/2001 | Cloke et al. |
| 6,191,909 B1 | | 2/2001 | Cloke et al. |

(Continued)

FOREIGN PATENT DOCUMENTS

| | | |
|---|---|---|
| EP | 0246433 B1 | 8/1992 |
| WO | WO03019559 A1 | 3/2003 |
| WO | WO2005077043 A3 | 8/2005 |

OTHER PUBLICATIONS

U.S. Appl. No. 13/235,209, filed Sep. 16, 2011, to Dennis W. Hogg, 16 pages.
Notice of Allowance dated Jul. 31, 2013 from U.S. Appl. No. 13/235,209, 10 pages.
Notice of Allowance dated Nov. 6, 2013 from U.S. Appl. No. 13/470,190, 10 pages.

* cited by examiner

*Primary Examiner* — Thang Tran

(57) ABSTRACT

A disk drive is disclosed comprising a head actuated over a disk, and a fly height transducer operable to generate a fly height signal for the head. The disk drive further comprises control circuitry comprising a current sensor operable to detect a current flowing through the fly height transducer. The current sensor comprises a differential amplifier operable to amplify the current flowing through the fly height transducer over a first range using a first gain, and amplify the current flowing through the fly height transducer over a second range using a second gain less than the first gain, wherein at least part of the second range is different than the first range.

4 Claims, 2 Drawing Sheets

(56) References Cited

U.S. PATENT DOCUMENTS

| | | |
|---|---|---|
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,259,670 B1 | 7/2001 | Hrinya |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,359,746 B1 | 3/2002 | Kakekado et al. |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,504,669 B1 | 1/2003 | Janz et al. |
| 6,519,104 B1 | 2/2003 | Cloke et al. |
| 6,525,892 B1 | 2/2003 | Dunbar et al. |
| 6,529,342 B1 | 3/2003 | Feng et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,775,089 B1 | 8/2004 | Bonin et al. |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,876,509 B2 | 4/2005 | Bonin et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,693 B2 | 5/2005 | Boutaghou et al. |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,967,805 B1 | 11/2005 | Hanchi et al. |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,980,383 B2 | 12/2005 | Brunnett et al. |

(56) References Cited

U.S. PATENT DOCUMENTS

| | | | |
|---|---|---|---|
| 6,982,406 B2 | 1/2006 | Chen |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 6,998,850 B2 | 2/2006 | Baumgartner |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,068,457 B2 | 6/2006 | Riddering et al. |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,280,305 B2 | 10/2007 | Kwon et al. |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,310,197 B2 | 12/2007 | Baumgart et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,375,912 B2 | 5/2008 | Brannon et al. |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,440,220 B1 | 10/2008 | Kang et al. |
| 7,451,344 B1 | 11/2008 | Rothberg |
| 7,465,995 B2 | 12/2008 | Chu et al. |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,679,857 B2 | 3/2010 | Zhu et al. |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,796,356 B1 | 9/2010 | Fowler et al. |
| 7,800,858 B1 | 9/2010 | Bajikar et al. |
| 7,804,657 B1 | 9/2010 | Hogg et al. |
| 7,808,746 B2 | 10/2010 | Burbank et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,903,365 B2 | 3/2011 | Watanabe |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,952,829 B2 | 5/2011 | Ionescu |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |

(56) References Cited

U.S. PATENT DOCUMENTS

| | | |
|---|---|---|
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 2002/0105750 A1* | 8/2002 | Li et al. .......................... 360/75 |
| 2005/0128630 A1 | 6/2005 | Huang et al. |
| 2005/0174665 A1 | 8/2005 | Zhang et al. |
| 2005/0258339 A1 | 11/2005 | Chen |
| 2006/0072232 A1 | 4/2006 | Fischer |
| 2006/0077584 A1 | 4/2006 | Nainar |
| 2006/0268445 A1 | 11/2006 | Brannon et al. |
| 2007/0201158 A1 | 8/2007 | Chan |
| 2009/0113702 A1 | 5/2009 | Hogg |
| 2009/0310247 A1 | 12/2009 | Suzuki |
| 2010/0020439 A1 | 1/2010 | Watanabe |
| 2010/0027157 A1 | 2/2010 | Nagasaka |
| 2010/0306551 A1 | 12/2010 | Meyer et al. |
| 2011/0090586 A1* | 4/2011 | Tsuwako et al. ................. 360/59 |
| 2011/0163730 A1 | 7/2011 | Zhang et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0070365 A1* | 3/2013 | Hogg .............................. 360/75 |
| 2013/0235487 A1* | 9/2013 | Natzke et al. ................... 360/75 |

DISK DRIVE COMPRISING EXTENDED RANGE HEAD PROXIMITY SENSOR

CROSS REFERENCE TO RELATED APPLICATION

This application is a divisional of U.S. application Ser. No. 13/470,190, entitled "DISK DRIVE COMPRISING EXTENDED RANGE HEAD PROXIMITY SENSOR," filed on May 11, 2012, which is hereby incorporated by reference in its entirety.

BACKGROUND

Current sensors are employed in numerous applications, such as light sensors, temperature sensors, gas sensors, magnetic sensors, motion sensors, proximity sensors, etc. A current sensing circuit typically comprises a suitable transducer that responds to an external stimulus, such as a photodiode responding to changing light, a magnetoresistive sensor responding to changing magnetic flux, or a tunneling current proximity probe responding to the proximity of elements, such as the proximity of a head to a disk in a disk drive. Typically the resistance of a current sensing transducer changes in response to the external stimulus so that when a bias voltage is applied to the transducer, the change in resistance caused by a change in the external stimulus results in a corresponding change in current passing through the transducer. Accordingly, a current sensor is typically employed to detect the change in current and thereby detect changes in the external stimulus.

Certain current sensing transducers, such as the aforementioned tunneling current proximity sensor, operate at very large resistance relative to the stimulus, and therefore they transduce an extremely small current (e.g., nanoamperes). There is, therefore, a need for an extremely sensitive current sensor capable of accurately detecting the extremely small currents generated by certain current sensing transducers.

DETAILED DESCRIPTION OF EMBODIMENTS OF THE INVENTION

Figure 1A:
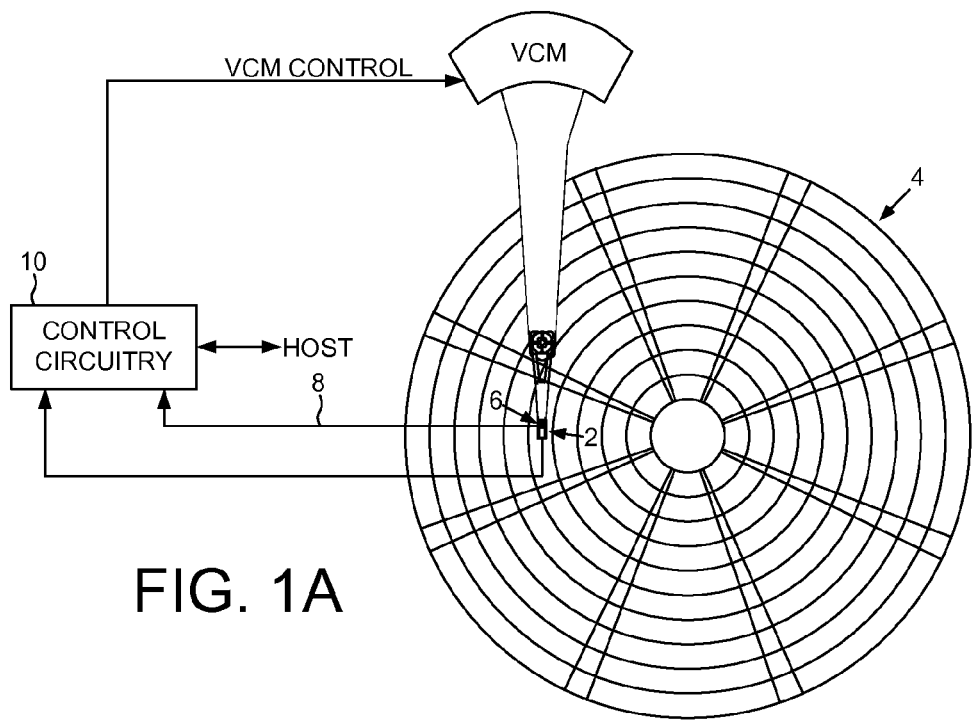
FIG. 1A shows a disk drive according to an embodiment of the present invention comprising a head actuated over a disk, a fly height transducer, and control circuitry including a current sensor operable to detect a current flowing through the fly height transducer.

FIG. 1A shows a disk drive according to an embodiment of the present invention comprising a head 2 actuated over a disk 4, and a fly height transducer 6 operable to generate a fly height signal 8 for the head 2. The disk drive further comprises control circuitry 10 comprising a current sensor 12 (FIG. 1B) operable to detect a current flowing through the fly height transducer 6. The current sensor 12 comprises a differential amplifier operable to amplify the current flowing through the fly height transducer 6 over a first range 16 using a first gain (FIG. 2A), and amplify the current flowing through the fly height transducer 6 over a second range 18 using a second gain less than the first gain, wherein at least part of the second range is different than the first range.

Any suitable fly height transducer 6 may be employed in the embodiments of the present invention, and in one embodiment the fly height transducer 6 transduces the fly height of the head 2 into an extremely small current (e.g., nanoamperes). For example, in one embodiment the fly height transducer 6 may comprise a tunneling sensor that operates at very large resistance relative to the stimulus, and therefore transduces an extremely small current. In addition, the fly height transducer 6 may exhibit an exponential response as the head 2 comes in close proximity until it eventually contacts the disk 4. Accordingly, in one embodiment the current sensor 12 for detecting the current flowing through the fly height transducer 6 operates at a first gain over a first range corresponding to a higher fly height, and as the fly height decreases, the current sensor 12 eventually transitions into a second gain in order to detect the current over a second range.

Referring again to FIG. 1B, in this embodiment the current sensor 12 comprises a differential amplifier that operates according to a first and second gain. The differential amplifier comprises a first differential voltage output (OUT_R1) representing the current flowing through the fly height transducer 6 over the first range 16, and a second differential voltage output representing the current flowing through the fly height transducer 6 over the second range 18. In one embodiment, the second differential voltage output may correspond to OUT_R2. In another embodiment, the second differential voltage output may be generated by adding both of the above described voltage outputs (OUT_R1+OUT_R2).

Figure 1B:
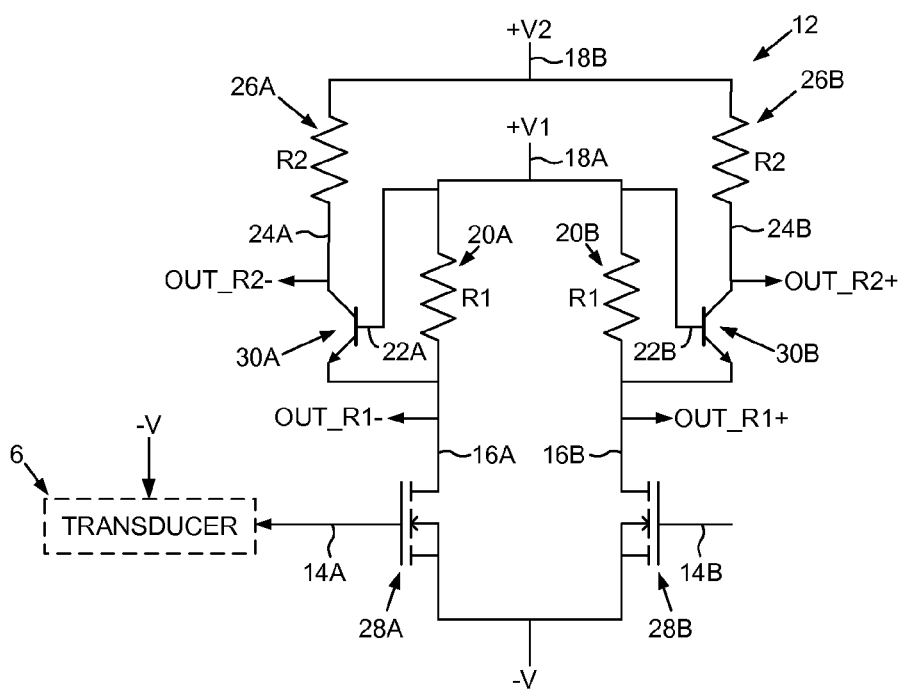
FIG. 1B shows a current sensor according to an embodiment of the present invention comprising a differential amplifier operable to amplify the current flowing through the fly height transducer over a first range using a first gain, and amplify the current flowing through the fly height transducer over a second range using a second gain less than the first gain.

In the embodiment of FIG. 1B, the differential amplifier 12 comprises a first input node 14A connected to the fly height transducer 6, and a first output node 16A connected to a first supply voltage +V1 18A through a first resistor R1 20A. The differential amplifier 12 further comprises a second input node 22A connected to the first supply voltage 18A, and a second output node 24A connected to a second supply voltage +V2 18B through a second resistor R2 26A. In one embodiment, the first supply voltage +V1 18A substantially equals the second supply voltage +V2 18B, and in another embodiment the first supply voltage +V1 18A is substantially different from the second supply voltage +V2 18B. The other components shown in FIG. 1B are mirror components having the same respective reference numbers as would be understood by one skilled in the art.

Figure 2A:
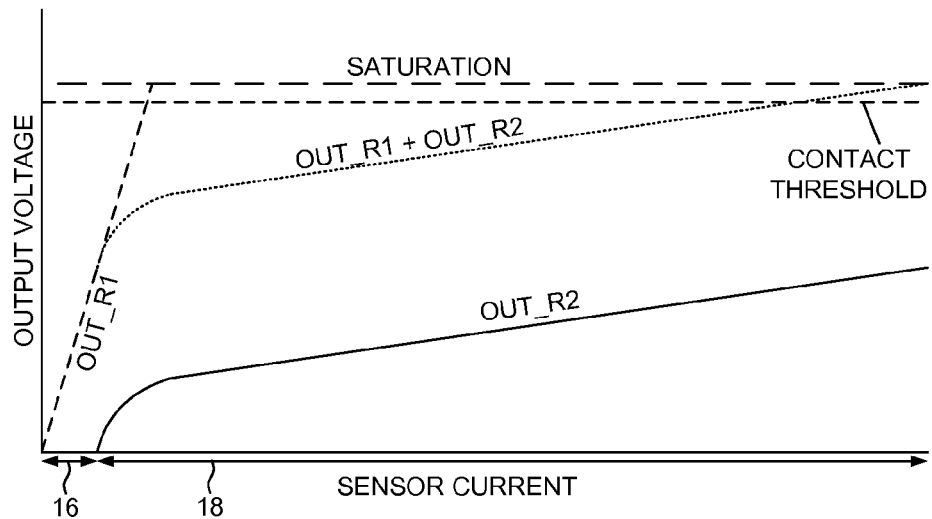
FIG. 2A is a graph illustrating the differential voltage outputs of the differential amplifier over the two different ranges of sensor currents according to an embodiment of the present invention.

The operation of the differential amplifier 12 shown in FIG. 1B is understood with reference to FIG. 2A which shows a graph of the differential voltage outputs OUT_R1 and OUT_R2 (y-axis) relative to the current flowing through the fly height transducer 6 (x-axis). At very low currents corresponding to a high fly height, both differential voltage outputs OUT_R1 and OUT_R2 are substantially zero. As the fly height decreases and the current begins to flow through the fly height transducer 6, a first transistor 28A of the differential amplifier 12 (FIG. 1B) begins conducting causing the first differential voltage output OUT_R1 to begin ramping according to the first gain as illustrated in FIG. 2A. When the current flowing through the fly height transducer 6 reaches a threshold level (at the end of the first range 16), a second transistor 30A begins conducting due to the voltage across the first resistor R1 20A increasing. In one embodiment, the second transistor 30A transitions the gain of the differential amplifier 12 by connecting the first resistor R1 20A substantially in parallel with the second resistor R2 26A.

Connecting the resistors R1 and R2 in parallel reduces the resistance of the output stage, thereby decreasing the gain of the differential amplifier 12. In one embodiment, the resistance of the second resistor R2 26A is less than the resistance of the first resistor R1 20A which further reduces the resistance when they are connected in parallel. This reduction in resistance at the output stage results in a corresponding increase in the range of the current sensor. Referring again to FIG. 2A, the first range 16 extends from zero current up to a threshold level during which the output of the current sensor is taken from the first differential voltage output OUT_R1. When the current reaches the threshold level, the output of the current sensor may be taken from the second differential voltage output OUT_R2, or the addition of OUT_R1 and OUT_R2 as shown in FIG. 2A. The current sensor exhibits an output voltage over an extended range 18 until eventually the first transistor 28A reaches a saturation level. Without transitioning into a lower gain in order to extend the range of the current sensor, the first differential voltage output OUT_R1 would reach the saturation level much faster as illustrated in FIG. 2A, resulting in a very limited range (and limited resolution) current sensor.

In one embodiment, the first and second differential voltage outputs 16A and 24A of the differential amplifier are evaluated to determine a proximity of the head 2 relative to the disk 4. In addition, the first and second differential voltage outputs 16A and 24A may be evaluated to detect when the head 2 has contacted the disk 4. For example, in one embodiment a head/disk contact event may be detected when the addition of the first and second voltage outputs (OUT_R1+ OUT_R2) exceeds a threshold as illustrated in FIG. 2A. In one embodiment, when head/disk contact is detected the differential amplifier 12 may be disabled (using a suitable isolation transistor not shown) in order to prevent the first transistor 28A from saturating. In this manner, the dual gain operation of the differential amplifier 12 as described above enables a very sensitive fly height transducer 6 (such as a tunneling sensor) to be used both as a proximity sensor and as a contact sensor.

Figure 2B:
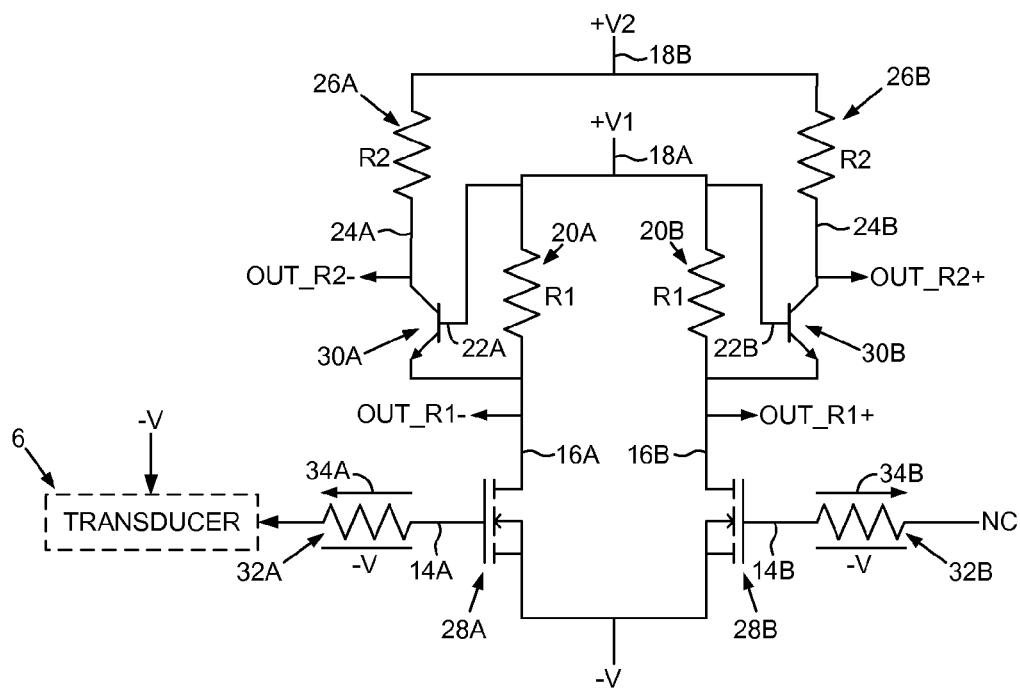
FIG. 2B shows an embodiment of the present invention wherein the current sensor comprises a differential amplifier biased by leakage current.

FIG. 2B shows a current sensor according to an embodiment of the present invention including the dual gain differential amplifier 12 described above with reference to FIG. 1B, and further comprising a first resistor 32A having a first end coupled to the first input node 14A and a second end for coupling to the transducer 6, and a second resistor 32B having a first end coupled to a second input node 14B and a second end. When the second end of the second resistor 32B is unconnected and the differential amplifier 12 is driven with a supply voltage, the first input node 14A is biased by a first leakage current 34A and the second input node 14B is biased by a second leakage current 34B such that the differential voltage outputs OUT_R1 and OUT_R2 represent a current flowing through the transducer 6.

In one embodiment, the differential amplifier 12 is fabricated such that the first leakage current 34A substantially matches the second leakage current 34B (e.g., by matching components). When the transducer 6 draws current it depletes the first leakage current 34A biasing the first input node 14A, thereby changing the voltage at the first input node 14A so that the differential voltage output represents the current flowing through the transducer 6. In this manner, the current sensor in this embodiment is capable of detecting very small currents flowing through the transducer 6 on the order of a fraction of the first leakage current 34A. For example, when the first leakage current 34A is a nanoampere the current sensor may detect a transducer current as small as a fraction of a nanoampere (e.g., 0.01 nanoamperes).

What is claimed is:

1. A disk drive comprising:
    a disk;
    a head actuated over the disk;
    a tunneling sensor; and
    control circuitry comprising a current sensor configured to detect a current flowing through the tunneling sensor, the control circuitry configured to:
        detect a proximity of the head relative to the disk in response to the detected current flowing through the tunneling sensor; and
        detect the head contacting the disk in response to the detected current flowing through the tunneling sensor,
    wherein the current sensor:
        operates at a first gain over a first range corresponding to a first fly height; and
        operates at a second gain over a second range corresponding to a second fly height, wherein the second fly height is lower than the first fly height.

2. The disk drive as recited in claim 1, wherein the tunneling sensor operates at a large resistance relative to a stimulus.

3. A method of operating a disk drive, the disk drive comprising a head actuated over a disk, and a tunneling sensor, the method comprising:
    detecting a current flowing through the tunneling sensor;
    detecting a proximity of the head relative to the disk in response to the detected current flowing through the tunneling sensor; and
    detecting the head contacting the disk in response to the detected current flowing through the tunneling sensor,
    wherein detecting the current flowing through the tunneling sensor comprises:
    detecting the current at a first gain over a first range corresponding to a first fly height; and
    detecting the current at a second gain over a second range corresponding to a second fly height, wherein the second fly height is lower than the first fly height.

4. The method as recited in claim 3, wherein the tunneling sensor operates at a large resistance relative to a stimulus.

* * * * *